UNITED STATES PATENT OFFICE.

FRIEDRICH SCHMIDT, OF BROOKLYN, NEW YORK.

LOTION.

SPECIFICATION forming part of Letters Patent No. 434,727, dated August 19, 1890.

Application filed May 21, 1890. Serial No. 352,662. (No specimens.)

*To all whom it may concern:*

Be it known that I, FRIEDRICH SCHMIDT, of Brooklyn, New York, have invented an Improved Medicinal Compound, of which the following is a specification.

This invention relates to a medicinal compound more particularly designed for the healing and cooling of wounds.

In preparing my improved medicinal preparation I mix one hundred parts of distilled water with thirty parts of alum, thirty parts of refined sugar, ten parts of cloves, (*Caryophyllus aromaticus*,) ten parts of yarrow, (*Achillea millefolium*,) ten parts of saffron, and ten parts of plantain, (*plantago*.) The alum and powdered sugar are first mixed with the water, which should be slightly warmed. This mixture is allowed to remain undisturbed in a warm room from three to four days, when a sediment will settle at the bottom. This sediment is removed, and then the powdered saffron is stirred into the clear liquid. The yarrow, cloves, and plantain are dried, powdered, and mixed together. Next, they are cooked with an equal quantity of water, the cooking operation being continued until the water has evaporated. The pulp thus obtained is added to the alum, sugar, saffron, and water, the mixture being well stirred. After that the mixture is allowed to stand and settle for five to six days, when the clear liquid is drawn off and bottled ready for use.

To use the mixture, a small quantity of it is poured upon lint, which is placed upon a wound beneath a proper bandage, as usual. The alum and the sugar have a cooling effect upon the wounds, which, when combined with the purifying and healing properties of the other ingredients, have the effect to keep the wounds from inflammation while the healing process is going on.

What I claim is—

A medicinal compound composed of water, alum, sugar, yarrow, cloves, saffron, and plantain, substantially as specified.

FRIEDRICH SCHMIDT.

Witnesses:
A. JONGHMANS,
F. V. BRIESEN.